US011051128B2

(12) United States Patent
Lelkens et al.

(10) Patent No.: US 11,051,128 B2
(45) Date of Patent: Jun. 29, 2021

(54) LOCALIZATION OF A MOBILE DEVICE

(71) Applicant: SIGNIFY HOLDING B.V., Eindhoven (NL)

(72) Inventors: Armand Michel Marie Lelkens, Heerlen (NL); Ashish Vijay Pandharipande, Eindhoven (NL); Xiangyu Wang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 288 days.

(21) Appl. No.: 15/757,762

(22) PCT Filed: Sep. 19, 2016

(86) PCT No.: PCT/EP2016/072166
§ 371 (c)(1),
(2) Date: Mar. 6, 2018

(87) PCT Pub. No.: WO2017/050695
PCT Pub. Date: Mar. 30, 2017

(65) Prior Publication Data
US 2020/0228924 A1     Jul. 16, 2020

(30) Foreign Application Priority Data

Sep. 21, 2015 (EP) .................... 15186048

(51) Int. Cl.
*H04W 4/029* (2018.01)
*G01S 5/02* (2010.01)
*H04W 64/00* (2009.01)

(52) U.S. Cl.
CPC ............. *H04W 4/029* (2018.02); *G01S 5/021* (2013.01); *G01S 5/0252* (2013.01);
(Continued)

(58) Field of Classification Search
CPC ..... H04W 4/029; H04W 64/00; G01S 5/0284; G01S 5/0278; G01S 5/0252; G01S 5/021
(Continued)

(56) References Cited

U.S. PATENT DOCUMENTS

2010/0311437 A1* 12/2010 Palanki ................... G01S 5/021
455/456.1
2012/0184286 A1* 7/2012 Richardson ........... H04W 64/00
455/456.1
(Continued)

FOREIGN PATENT DOCUMENTS

GB        2481851 A     11/2012

OTHER PUBLICATIONS

Wannier, Gregory H., "Statistical Physics," Chapter 22, "Fluctuations and Brownian Motion," Jan. 1966, Statistical Physics (2 Pages).

*Primary Examiner* — Michael Y Mapa

(57) ABSTRACT

A method comprising: obtaining a respective measurement of a beacon signal transmitted wirelessly between the mobile device and each of a plurality of the reference nodes; for each of a plurality of different reference locations within the environment, distinct from the reference nodes, obtaining a corresponding measurement of a test signal previously transmitted or modelled to have been transmitted wirelessly between the reference location and each of the plurality of reference nodes; for each of the reference locations, determining for each of said plurality of beacon nodes a difference between the respective measurement of the beacon signal and the measurement of the test signal; for each of the reference locations, determining a value of a measure of statistical spread in these differences; and estimating the location of the mobile device in dependence on a compari-
(Continued)

son of the values of the measure of statistical spread determined for the different reference locations.

14 Claims, 2 Drawing Sheets

(52) U.S. Cl.
CPC .......... *G01S 5/0278* (2013.01); *G01S 5/0284* (2013.01); *H04W 64/00* (2013.01)

(58) Field of Classification Search
USPC .............................................. 455/456.1–457
See application file for complete search history.

(56) References Cited

U.S. PATENT DOCUMENTS

| | | |
|---|---|---|
| 2015/0133149 A1 | 5/2015 | Kim et al. |
| 2016/0165566 A1* | 6/2016 | Jung ..................... H04W 4/029 455/456.1 |
| 2017/0134899 A1* | 5/2017 | Chan ..................... H04W 64/00 |
| 2018/0121571 A1* | 5/2018 | Tiwari ................... G08B 25/14 |

* cited by examiner

LOCALIZATION OF A MOBILE DEVICE

CROSS-REFERENCE TO PRIOR APPLICATIONS

This application is the U.S. National Phase application under 35 U.S.C. § 371 of International Application No. PCT/EP2016/072166, filed on Sep. 19, 2016, which claims the benefit of European Patent Application No. 15186048.3, filed on Sep. 21, 2015. These applications are hereby incorporated by reference herein.

TECHNICAL FIELD

The present disclosure relates to localization, i.e. the process of determining the location of a mobile device based on a network of wireless nodes.

BACKGROUND

There are various reasons why it may be desirable to be able to detect the location of a wireless device, such as to provide location dependent services. For instance, one application of a positioning system is to automatically provide a wireless mobile device with access to control of a utility such as a lighting system, on condition that the mobile device is found to be located in a particular spatial region or zone associated with the lighting or other utility. E.g. access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include indoor navigation, location-based advertising, service alerts or provision of other location-related information, user tracking, asset tracking, or taking payment of road tolls or other location dependent payments. E.g. Determining a mobile device's position can enable the exchange of advertisements like value coupons (in shops), detailed information (in museums) or way finding to guide one to a specified location (airports) or control local settings of e.g. lighting (offices).

In a localization system, the location of a wireless device such as a mobile user terminal can be determined with respect to a location network comprising a plurality of wireless reference nodes, sometimes also referred to as anchor nodes. These anchors are wireless nodes whose locations are known a priori, typically being recorded in a location database which can be queried to look up the location of a node. The anchor nodes thus act as reference nodes for localization. Measurements are taken of wireless signals transmitted between the mobile device and a plurality of anchor nodes, for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration or triangulation. Given the relative location of the mobile terminal and the known locations of the anchor nodes, this in turn allows the location of the mobile device to be determined in more absolute terms, e.g. relative to the globe or a map or floorplan.

The determination of the mobile device's location may be performed according to a "device-centric" approach or a "network-centric" approach. According to a device centric approach, each anchor or reference node emits a respective beacon signal. The mobile device takes measurements of beacon signals it receives from the reference nodes, obtains the locations of those nodes from the location server, and performs the calculation to determine its own location at the mobile device itself. According to a network-centric approach on the other hand, the reference nodes are used to take measurements of beacon signals received from the mobile device, and an element of the network such as the location server performs the calculation to determine the mobile device's location. Hybrid approaches are also possible, e.g. where the mobile device takes the raw measurements but forwards them to the location server to calculate its location.

Localization of a device can be performed indoors or outdoors. Outdoors people tend to use satellite-based positioning systems such as GPS (Global Positioning System), which are device centric systems in which the reference nodes are satellites and the beacon signals are microwave signals. These generally do not work well indoors, but other means have been developed for both indoor and outdoor positioning, typically based on radio beacon signals but potentially also other signal media such as infrared, visible light or ultrasound. For example, some buildings are being installed with indoor positioning systems comprising a network of dedicated anchor nodes. It is also known to incorporate the beaconing functionality of an anchor node into a unit that is primarily designed to provide a utility such as lighting into the environment in question, rather than the anchor node being a separate, dedicated, stand-alone unit. As another example, RF signals such as Wi-Fi signals emitted from pre-existing Wi-Fi access points (APs) or the like may be used as beacon signals for localization (e.g. exploiting the existence of Wi-Fi beacons having a primary function of advertising the network, or even actual Wi-Fi user traffic, for a secondary purpose of localization). Note that "beacon" as used herein is not limiting to any specific technology, but generally can refer to any wirelessly emitted signal capable of being used for localization (whether its primary or purpose or a secondary purpose).

As an alternative to trilateration, multilateration and triangulation, another localization technique is to determine the location of the mobile device based on a "fingerprint" of a known environment. Again this may be applied using a network centric, device centric or hybrid implementation; based on any signal medium such as radio, infrared light, visible light or ultrasound; emitted to or from any type of reference node, whether of a dedicated location network or otherwise.

The fingerprint comprises a set of data points each corresponding to a respective one of a plurality of locations throughout the environment in question. Each data point is generated during a training phase by placing a wireless device at the respective location, taking a measurement of the signals received from or by any reference nodes within range at the respective location (e.g. a measure of signal strength such as RSSI), and storing these measurements in a location server along with the coordinates of the respective location. The data point is stored along with other such data points in order to build up a fingerprint of the signal measurements as experienced over various locations within the environment, i.e. a signal map. These data points act as reference points (reference locations) for use in the localization. That is, once the system is deployed, the signal measurements stored in the fingerprint can then be compared with signal measurements currently experienced by a mobile device whose location is desired to be known, in order to estimate the location of the mobile device relative to the corresponding coordinates of the points in the fingerprint. For example this may be done by approximating that the device is located at the coordinates of the reference point having the closest matching signal measurements, or by interpolating between the coordinates of a subset of the reference points having signal measurements most closely matching those currently experienced by the device.

The fingerprint can be pre-trained in a dedicated training phase before the fingerprint is deployed by systematically placing a test device at various different locations in the environment. Alternatively or additionally, the fingerprint can be built up dynamically by receiving submissions of signal measurements experienced by the actual devices of actual users in an ongoing training phase.

Typically the Euclidean distance between a point in the fingerprint and the measured values is taken as a metric estimating the goodness of fit (closeness of match) for a specific reference point p:

$$D_p = \Sigma_b [M(b) - F(p,b)]^2$$

where M(b) is the current measurement of the signal from beacon (e.g. access point) b in dB, so on a logarithmic scale; and F(p,b) is the measured value from beacon b at reference point p (as stored in the fingerprint) also on a logarithmic scale.

The reference point p for which $D_p$ is smallest (or a combination of p's with small $D_p$) is chosen as the estimate of the location of the mobile device.

"Device Self-Calibration in Location systems using Signal Strength Histograms" (Christos Laoudias et al, Journal of Location Based Services 7(3):165-181, 203, DOI: 10.1080/17489725.2013.816792) identifies a problem with fingerprint based localization. That is, differences in the antenna gains of different mobile devices mean that the signal measurements are device dependent. Laoudias et al disclose a few different solutions by way of comparison. In one solution, Laoudias et al consider a metric for closeness of match (instead of $D_p$ above) that factors out the antenna gain. Specifically, Laoudias et al considers use of a metric that is based on the difference between the measurements of the signals from two different beacon nodes. However, this is too complex because it requires the difference to be computed for all possible combinations of beacon node pairs. As Laoudias et al themselves put it, "this method increases dramatically the dimensionality of fingerprints" (section 2.1). Hence Laoudias et al reject the attempt to factor out the antenna gain, and instead opt for an alternative way around the problem in the form of a self-calibration process. This involves calibrating for the antenna gain of the mobile device on the fly, using statistical properties of many received signals (received during operation rather than in the initial fingerprinting phase) in order to mitigate the device specific reception characteristics. Hence the mitigation is only achieved after the mobile device has already been in use for some time in the field, in order to gather enough data.

SUMMARY

The inventors have identified that the attempt to find a suitable metric that factors out antenna gain need not be abandoned. Particularly, for a given reference point p, the variance in the difference between the current signal measurement and the fingerprinted measurement over multiple beacons factors out the gain of the mobile device. Other measures of statistical spread can also be used. The inventors have identified that this variance or other such measure of statistical spread can be characteristic enough to estimate one's position from a fingerprint. Further, it need only require one value per beacon, thus reducing complexity compared to the metric considered by Laoudias et al.

Hence according to one aspect disclosed herein, there is provided a method of estimating a location of a mobile device within an environment based on an arrangement of wireless reference nodes, each of the reference nodes being a device for transmitting or receiving wireless signals; the method comprising: obtaining a respective measurement of a beacon signal transmitted wirelessly between the mobile device and each of a plurality of said reference nodes; for each of a plurality of different reference locations within the environment, distinct from the reference nodes, obtaining a corresponding measurement of a test signal previously transmitted or modelled to have been transmitted wirelessly between the reference location and each of the plurality of reference nodes; for each of the reference locations, determining for each of said plurality of beacon nodes a difference between the respective measurement of the beacon signal and the measurement of the test signal; for each of the reference locations, determining a value of a measure of statistical spread in said differences; and estimating the location of the mobile device from a comparison of the values of said measure of statistical spread determined for the different reference locations.

Preferably said measure of statistical spread is a measure of a deviation from an average of said differences. An advantage of this is that it is less susceptible to differences in device antenna gain.

In embodiments, the measurements of the test signal are empirical measurements taken using a test device placed at each of the reference locations.

Alternatively the measurements of the test signal may be modelled measurements, the test signal being modelled to have been transmitted. Use of RF propagation models is known to those skilled in the art; optionally in combination with an environmental map, detailing e.g. the presence and thickness of walls that may be used to model test signal propagation.

In embodiments said obtaining of the measurements of the test signal for each of the reference locations may be performed by looking up the measurements of the test signals in a pre-stored signal map.

In embodiments, said comparison may comprise selecting the reference location having the lowest value of said measure of statistical spread from amongst said values, and the estimation of the location of the mobile device based on said comparison may comprise estimating that location of the mobile device is the reference location having said lowest value of the measure of statistical spread.

Alternatively said comparison may comprise selecting the reference locations (plural) having the N lowest values of said measure of statistical spread from amongst said values (where N is a predetermined integer), and the estimation of the location of the mobile device based on said comparison may comprise interpolating between the reference locations having said lowest values of the measure of statistical spread. E.g. the location of the mobile device may be estimated to be an average or a weighted average of the N reference locations with the lowest values of the statistical spread.

In embodiments said measure of statistical spread may be variance.

Alternatively said measure of statistical spread may be standard deviation.

Alternatively, said measure of statistical spread may be variance raised to a power other than 1 and other than ½.

In embodiments, the beacon signals may be signals transmitted from the reference nodes to the mobile device, the measurements of the beacon signals being measurements taken at the mobile device (i.e. mobile centric or hybrid mobile centric). In this case the test signals may be signals transmitted or modelled to have been transmitted from the reference nodes to the reference locations, the measurements of the test signal being measurements taken at or modelled to have been taken at the reference locations. I.e. the measurements are of the beacon signals as received at the mobile device (or modelled to have been so received).

Alternatively the beacon signals may be signals transmitted from the mobile device to the reference nodes, the measurements of the beacon signals being measurements taken at the reference nodes (i.e. network centric or hybrid network centric). In this case the test signals may be signals transmitted or modelled to have been transmitted from the reference locations to the reference nodes, the measurements of the test signals being measurements taken at or modelled to have been taken at the reference locations. I.e. the measurements are of the beacon signals as received at the reference nodes and reference locations respectively (or modelled to have been so received).

According to another aspect of the present disclosure, there is provided an apparatus comprising a localization module for estimating a location of a mobile device within an environment based on an arrangement of wireless reference nodes, each of the reference nodes being a device for transmitting or receiving wireless signals; the localization module being configured to perform operations of: obtaining a respective measurement of a beacon signal transmitted wirelessly between the mobile device and each of a plurality of said reference nodes; for each of a plurality of different reference locations within the environment, distinct from the reference nodes, obtaining a corresponding measurement of a test signal previously transmitted or modelled to have been transmitted wirelessly between the reference location and each of the plurality of reference nodes; for each of the reference locations, determining for each of said plurality of beacon nodes a difference between the respective measurement of the beacon signal and the measurement of the test signal; for each of the reference locations, determining a value of a measure of statistical spread in said differences; and estimating the location of the mobile device in dependence on a comparison of the values of said measure of statistical spread determined for the different reference locations.

In embodiments said apparatus may be a mobile device (in a device centric or hybrid device centric arrangement).

Alternatively, in embodiment said apparatus may be a server (in a network centric or hybrid device centric arrangement).

According to another aspect of the present disclosure, there is provided a computer program product for estimating a location of a mobile device within an environment based on an arrangement of wireless reference nodes, each of the reference nodes being a device for transmitting or receiving wireless signals; the computer program product comprising code embodied on a computer-readable storage medium and/or being downloadable therefrom, and the code being configured so as when run on a processing apparatus to perform operations of: obtaining a respective measurement of a beacon signal transmitted wirelessly between the mobile device and each of a plurality of said reference nodes; for each of a plurality of different reference locations within the environment, distinct from the reference nodes, obtaining a corresponding measurement of a test signal previously transmitted or modelled to have been transmitted wirelessly between the reference location and each of the plurality of reference nodes; for each of the reference locations, determining for each of said plurality of beacon nodes a difference between the respective measurement of the beacon signal and the measurement of the test signal; for each of the reference locations, determining a value of a measure of statistical spread in said differences; and estimating the location of the mobile device in dependence on a comparison of the values of said measure of statistical spread determined for the different reference locations.

In embodiments, the apparatus and/or computer program product further be configured to perform operations in accordance with any of the features disclosed herein.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF PREFERRED EMBODIMENTS

The following describes an improved fingerprint based localization technique, e.g. for use in an indoor positioning system using RF transmissions and signal strength measurements to locate a mobile device. As discussed, in state of the art systems the actual measurements are compared to a fingerprint of previously measured signal strengths to decide on the location of the device. How well the observed values fit to the recorded fingerprints determines the location of the device. The following provides a new algorithm where not the signal distance to the fingerprint is used as a measure of goodness of fit, but rather the statistical variance of the received signals themselves is used as the measure of the goodness of fit. The same approach can be used for the reverse setup where the mobile device is transmitting and the infrastructure base stations act as receivers.

Details of the improved fingerprint based localization technique will be described shortly, but first there is given an overview of an example system in which the technique may be applied.

System Overview

Figure 1:
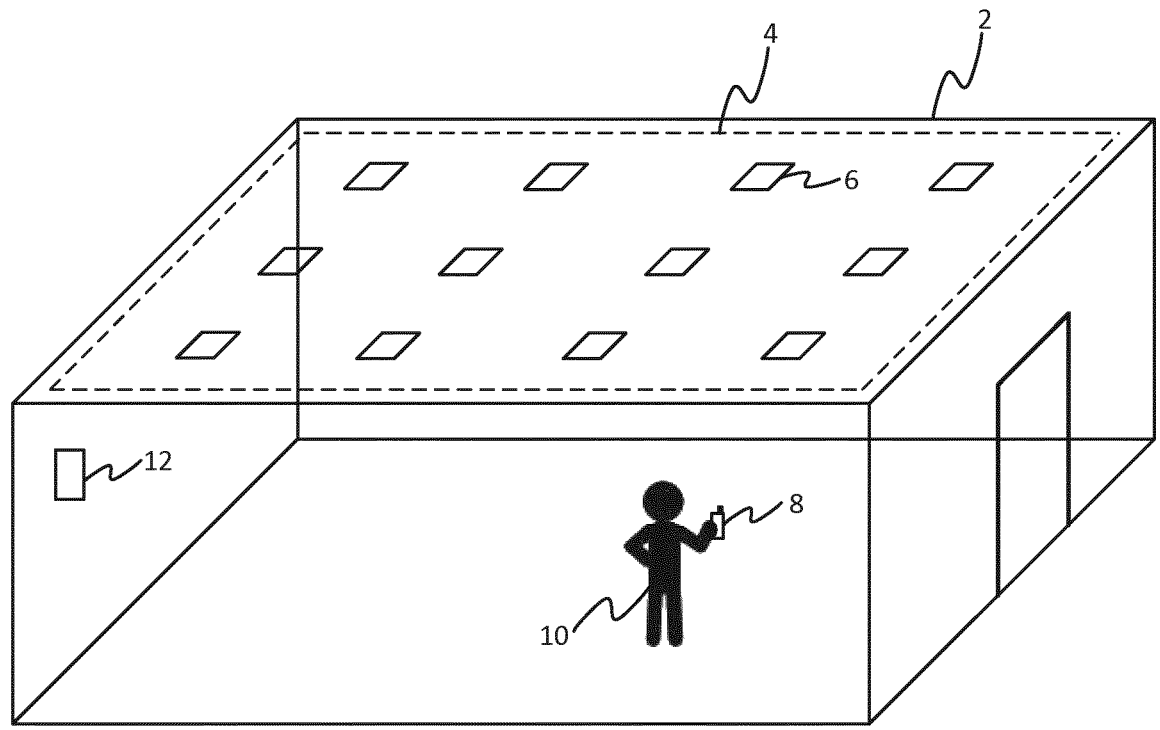
FIG. 1 is a schematic representation of an environment comprising a localization system in the form of an indoor positioning system.

FIG. 1 illustrates an example of a positioning system (localization system) installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positioning system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings. The following will be described in terms of the reference nodes 6 being anchor nodes of an indoor positioning system or the like, but it will be appreciated this is not necessarily the case in all possible embodiments.

In embodiments, each of the anchor nodes 6 does not take the form of a dedicated, stand-alone anchor node, but rather a unit of another utility that is present in the environment 2 for another purpose, and which is exploited in order to incorporate the additional functionality of an anchor node. In one particularly preferred implementation, each of the anchor nodes 6 is incorporated into a respective luminaire having an RF transceiver such as a Wi-Fi, ZigBee or Bluetooth transceiver for facilitating wireless control of the lighting in the environment 2 (as discussed in more detail later), and the anchor node functionality 6 is incorporated by exploiting the existence of this RF transceiver to additionally broadcast and/or receive localization beacon signals for an additional purpose of locating a mobile device 8. The luminaires 6 may for example be installed in the ceiling and/or walls, and/or may comprise one or more free standing units.

Alternatively, each of the anchor nodes 6 may be incorporated into any of a smoke alarm, a presence sensor and/or light sensor unit, a security alarm, an air-conditioning unit, a ventilation unit, or a heating unit (and each anchor node 6 does not necessarily have to be incorporated into the same type of unit, though they may be). In further alternatives each of the anchor nodes may take the form of a wireless access point (AP) which is already beaconing for another purpose relating to its function as an access point, such as to advertise the availability of its wireless network. In yet further alternatives, the anchor nodes 6 may be dedicated anchor nodes 6 having no other function than localization.

The environment 2 is occupied by a user 10 having a wireless device 8 disposed about his or her person (e.g. carried by hand, or in a bag or pocket). The wireless device 8 takes the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about a being or object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 10, being or object about which it is disposed.

Figure 2:
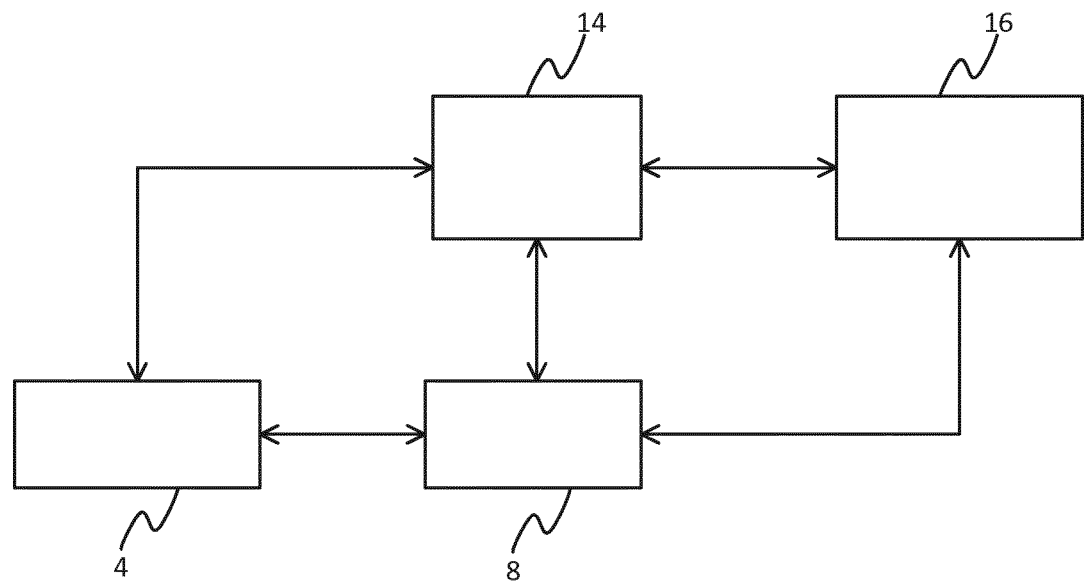
FIG. 2 is a schematic block diagram of a system for providing a location based service.

Referring to FIGS. 1 and 2, the environment 2 also comprises at least one wireless access point or router 12 enabling communication with a location server 14 (comprising one or more server units at one or more sites). The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2. The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi, ZigBee or Bluetooth, using which each of the anchor nodes 6 is able to wirelessly communicate via the access point 12 and therefore with the location server 14. Alternatively it is not excluded that instead of using a wireless access point 12, each of the anchor nodes 6 could be provided with a wired connection to the location server 14, or one or more of the anchor nodes 6 could be arranged to act as an access point for the others. The following may be described in terms of a wireless connection via an access point 12 or the like, but it will be appreciated that this is not limiting to all possible embodiments.

The mobile device 8 is also able to communicate via the wireless access point 12 using the relevant radio access technology, e.g. Wi-Fi, Zigbee or Bluetooth, and thereby to communicate with the location server 14. Alternatively or additionally, the mobile device 8 may be configured to communicate with the location server 14 via other means such as a wireless cellular network such as a network operating in accordance with one or more 3GPP standards. Further, the mobile device 8 is able to wirelessly receive beacon signals from, or transmit beacon signals to, any of the anchor nodes 6 that happen to be in range. In embodiments this communication may be implemented via the same radio access technology as used to communicate with the access point 12, e.g. Wi-Fi, Zigbee or Bluetooth, though that is not necessarily the case in all possible embodiments.

Generally any of the communications described in the following may be implemented using any of the above options or others for communicating between the respective entities 6, 8, 12, 14 and for conciseness the various possibilities will not necessarily be repeated each time.

The beacon signals between the anchor nodes 6 and the mobile device 8 are the signals whose measurements are used to determine the location of the mobile device 8. In a device-centric approach the anchor nodes 6 each broadcast a signal and the mobile device 8 listens, detecting one or more of those that are currently found in range and taking a respective signal measurement of each. Each anchor node 6 may be configured to broadcast its beacon signal repeatedly. The respective measurement taken of the respective beacon signal from each detected anchor node 6 may for example comprise a measurement of signal strength (e.g. RSSI), time of flight (ToF), angle of arrival (AoA), and/or any other property that varies with distance or location.

In a network-centric approach on the other hand, the mobile device 8 broadcasts a beacon signal and the anchor nodes 6 listen, detecting an instance of the signal at one or more of those nodes 6 that are currently in range. In this case the mobile device 8 may broadcast its beacon signal repeatedly. The respective measurement taken of each instance of the beacon signal from the mobile device 8 may comprise a measure of signal strength (e.g. RSSI) or time of flight (ToF), angle of arrival (AoA), and/or any other property that varies with distance or location. In an example of a hybrid approach, the nodes 6 may take the measurements but then send them to the mobile device 8, or the mobile device 8 may take the measurements but send them to the location server 14.

There are various options for the manner in which such measurements may be started and conducted. For example, either the mobile device 8 may initiate the transmission upon which the measurement is based, or the network may initiate the transmission. Both are possible, but it may have some impact how the rest of the process is implemented, in particular for time-of-flight measurements. Time-of-flight measurements can be obtained by establishing either a one way transmission delay or a two-way transmission delay (round trip time, RTT). A measurement of one-way delay can suffice if all relevant elements in the network have a synchronized clock or can reference a common clock. In this case the mobile device 8 may initiate the measurement with a single message transmission, adding a timestamp (e.g. time or time+date) of transmission to the message. If on the other hand the measurement is not based on a synchronized or common clock, the anchor or reference nodes 6 can still perform a measurement by bouncing individual messages back from the mobile device 8 and determining the round-trip time-of-flight. The latter may involve coordination from the nodes attempting to measure.

In the case of signal strength measurements, there are also different options for implementing these. The determination of distance from signal strength is based on the diminishment of the signal strength over space between source and destination, in this case between the mobile device 8 and anchor or reference node 6. This may for example be based on a comparison of the received signal strength with a-prior knowledge of the transmitted signal strength (i.e. if the nodes 6 or mobile device 8 are known or assumed to always transmit with a given strength), or with an indication of the transmitted signal strength embedded in the signal itself, or with the transmitted signal strength being communicated to the node 6 or device 8 taking the measurement via another channel (e.g. via location server 14).

Any one or a combination of these approaches or others may be applied in conjunction with the system disclosed herein. Whatever approach is chosen, once a beacon signal measurement is available from or at each of a plurality of the anchor nodes 6, it is then possible to determine the location of the mobile device 8 relative to the location network 4 using a suitable localization technique. In the present disclosure, the localization technique used is an improved fingerprint based technique, to be discussed shortly.

In addition, the "absolute" locations of the anchor nodes 6 (or more generally reference nodes) are known, for example from a location database maintained by the location server 14, or by the respective location of each anchor node 6 being stored at the node itself (e.g. and communicated from each relevant nodes to the mobile device 8 in a device centric approach). The absolute location is a physical location of the node in a physical environment or framework, being known for example in terms of a geographic location such as the location on a globe or a map, or a location on a floorplan of a building or complex, or any real-world frame of reference.

By combining the relative location of the mobile device 8 with the known locations of the anchor nodes 6 used in the calculation, it is then possible to determine the "absolute" location of the mobile device 8. Again the absolute location is a physical location of the device in a physical environment or framework, for example a geographic location in terms of the location on a globe or a map, or a location on a floorplan of a building or complex, or any more meaningful real-world frame of reference having a wider meaning than simply knowing the location relative to the location network 4 alone.

In embodiments, the absolute location of the nodes 6 may be stored in a human understandable form and/or the absolute location of the mobile device 8 may be output in a human understandable form. For example, this may enable the user 10 to be provided with a meaningful indication of his or her location, and/or may enable the administrator of a location-based service to define rules for granting or prohibiting access to the service or aspects of the service. Alternatively it is possible for the location of the nodes 6 and/or mobile device 8 to only ever be expressed in computer-readable form, e.g. to be used internally within the logic of the location based service.

In other embodiments it is not excluded that the location is only ever expressed relative to the location network 4, 6 and not as a more meaningful "absolute" location. For example if each anchor node 6 is integrated with a respective luminaire (see below) and the location is being determined for the purpose of controlling those luminaires, then in some embodiments it may only be necessary to determine the user's location relative to the framework of points defined by the anchor nodes of these luminaires (though in other similar arrangements it may still be desired to define lighting control regions relative to the floorplan of a building or the like).

In a device-centric approach, the beacon signal from each anchor node 6 comprises an ID of the respective anchor node. In a network-centric approach on the other hand, the beacon signal comprise an ID of the mobile device 8, and the anchor nodes 6 submit the beacon signal measurements they took to the location server 14 along with the mobile device's ID and their own respective IDs (e.g. via the wireless access point 12). The location server 14 then performs the calculation of the device's location at the server 14. In an example of a hybrid approach, the mobile device 8 may take the measurements of the beacon signals from the nodes 6, but submit them along with the respective received IDs to the location server 14 in a raw or partially processed form for the calculation to be performed or completed there.

With regard to security, provided that the localization messages are distributed internally within the localization system 4, 6, 14 security may be less of an issue; but in the case of two-way time of flight messages (RTT) for example, or where the reports are transmitted over a public network, it may be advantageous to provide them with a time-stamp (measurement time) or a nonce, and/or to "hash" the messages (digital signature) so as to thwart any replay attacks on the network backbone. The same could be done with the measurement reports sent to the location server 14. Such measures are not essential but may be desirable in embodiments, particularly if the location-based service or functionality is susceptible to abuse or involves financial transactions or the like.

The determined location may be used to provide any number of location related services: such as to provide the user 10 with information of his or her own location, to track the mobile device 8 or user 10, or to assess whether the mobile device 8 is granted access to some location-dependent service.

To such ends, in embodiments there is provided a location-based service (LBS) access system 16 in the form of an LBS server, arranged to receive an indication of the determined location of the mobile device 8 as determined by the localization server 14 or mobile device 8, from the localization server 14 or mobile device 8, and to provide a location based service (LBS) based thereon.

In embodiments, the LBS server 16 conditionally grants access to the service in dependence on the absolute location of the mobile device 8. In a device centric approach the mobile device 8 submits its determined absolute location (e.g. in terms of global coordinates, map coordinates or coordinates on a floor plan) to the service access system 16 over a connection via the wireless access point 12 or other means such as a cellular connection. The service access system 16 then assesses this location and grants the mobile device 8 with access to the service on condition that the location is consistent with provision of the service (and any other access rules that happens to be implemented, e.g. also verifying the identity of the user 10). In a network centric approach, the location server 14 submits the determined absolute location of the mobile device 8 to the service access system 16, e.g. via a connection over a local wired or wireless network and/or over a wide area network or inter-network such as the Internet. Alternatively the location server 14 may send the absolute location to the mobile device 8, and the mobile device may then forward it on to the service access system 16. In another alternative the service could be provided directly from the location server 14, or could even be implemented on an application running on the mobile device 8 itself.

However, it will be appreciated that conditionally granting access to a location dependent service is not the only possible application of localization. E.g. as mentioned, the location could instead be used to plot the location of the user 10 or mobile device 8 on a map.

The following are some examples of location-related services or functions that may be provided in accordance with embodiments of the present disclosure:
  allowing control of a utility such as lighting from an application running on the mobile device 8, where the user can only control the lighting or utility in a given room or zone when found to be located in that room or zone, or perhaps an associated zone;
  providing location based advertising, alerts or other information to the mobile device 8, e.g. providing the device 8 with information on exhibits as the user 10 walks about a museum, providing the device 8 with information about products as the user 10 walks about a shop or mall, providing the device 8 with access to medical data only if present inside a hospital or specific zone within a hospital, or providing the device 8 with access to complementary media material only if present physically within a movie theatre or the like;
  accepting location dependent payments from the mobile device on condition that the device 8 is present in a certain region, e.g. payments in shops, payment of road tolls, "pay as you drive" car rental, or entrance fees to venues or attractions;
  providing access to medical data to a mobile device 8 on condition that the device 8 is detected to be within a hospital or other such medical facility;
  providing access to complementary media material to a mobile device (8) on condition that the mobile device 8 is detected to be within a certain movie theatre; and/or
  providing a navigation service such as an indoor navigation service to the mobile device 8 (in which case the location-related function comprises at least providing the device's absolute location to an application running on the mobile device 8, e.g. which the application may then use to display the user's location on a floor plan or map).

Note that FIG. 2 shows arrows in all directions to illustrate the possibility of either device centric or network centric approaches, but in any given implementation not all the communications shown need be bidirectional or indeed present at all.

Fingerprint Based Localization

The following describes an improved fingerprint based localization technique that can be implemented using beacon signals of any kind transmitted in either direction between the mobile device 8 and anchor nodes (reference nodes) 6. For instance the beacon signals may be dedicated beacons of an indoor positioning network, or signals emitted from pre-existing radio signal sources like Wi-Fi, ZigBee or Bluetooth devices already emitting such signals for some other, primary purpose (e.g. pre-existing beacons from Wi-Fi access points, etc.). The following computations may be performed by a localization module implemented at the mobile device 8, based on measurements of beacon signals as received by the mobile device from a plurality of the anchor nodes 6, or measurements of beacon signals as received by a plurality of the anchor nodes 6 from the mobile device but reported back to the mobile device 8. Alternatively the following computations may be performed by the localization server 14 based on measurements of beacon signals as received by a plurality of the anchor nodes 6 and reported to the localization server 14, or based on measurements of beacon signals as received the mobile device 8 from a plurality of the anchor nodes 6 but reported back to the localization server.

The localization module may be implemented in software stored on a storage medium of the mobile device 8 or localization server 14, and arranged to run on a processing apparatus of the mobile device 8 or localization server 14 respectively (the memory comprising one or more memory devices and the processing apparatus comprising one or more processing units). Alternatively it is not excluded that the localization module could be implemented in dedicated hardware circuitry on the mobile device 8 or localization server 14, or configurable or reconfigurable circuitry such a as PGA or FPGA, or any combination of hardware or software.

To determine the location of the mobile device 8, the received signal strengths (RSSIs) are compared with previously recorded values at each of a regular or irregular array of reference points (the "fingerprint"). Alternatively another property that varies with distance propagated could be used, such as time of flight (ToF), but by way of example the following will be described in terms of received signal strength. The fingerprint is determined during a so called offline calibration phase where the signal strength from all beacons is measured at some pre-determined reference points (reference locations). The reference point of which the fingerprint has the closest match to the actually measured values ("nearest neighbor" or NN) is chosen as an estimate for the mobile device's position. A measure for matching, conventionally the (Euclidean) distance between measured value and fingerprint value is taken. Optionally this approach may be fine-tuned e.g. by taking the average of a few (K) reference points that have the smallest signal distance ("KNN"), or a weighted average of these (W-KNN). Some methods go even further by dynamically selecting K depending on signal distances (Enhanced WKNN).

Figure 3:
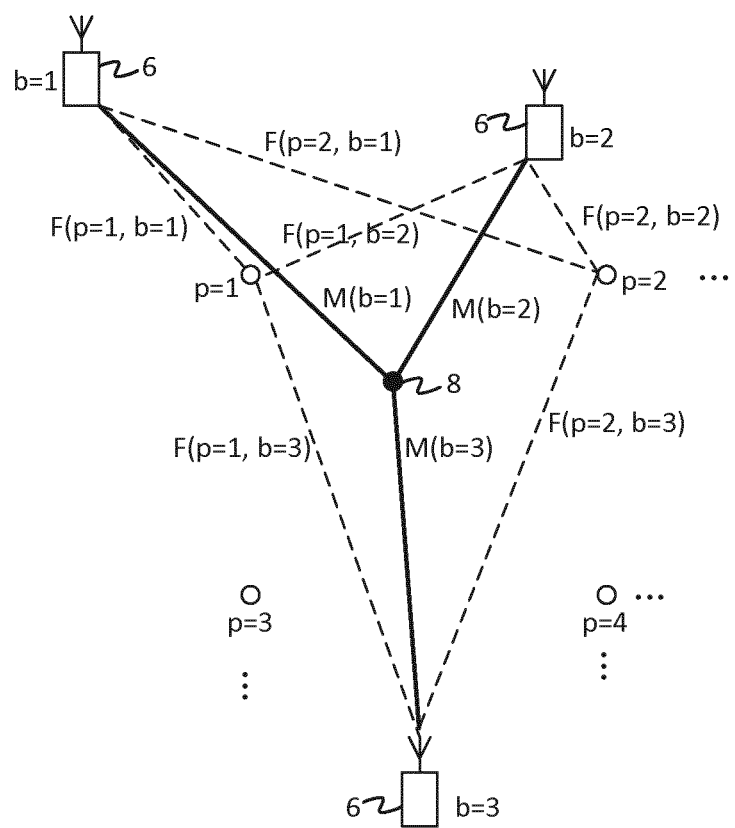
FIG. 3 is a schematic illustration of a fingerprinting technique for localization.

Reference may be made to FIG. 3, which shows a plurality of the anchor nodes 6, arbitrarily numbered b=1 . . . B, and a plurality of reference points (reference locations) arbitrarily labelled p=1 . . . P. The dotted lines represent, for each of the reference points p=1 . . . P, the signals transmitted between a test device (commissioning device) placed at the reference point p and each of the plurality b=1 . . . 6 anchor nodes 6 in question in order to create the signal map referred to as the fingerprint. The bold lines represent the signals transmitted between the mobile device 8 to be localized by comparison with the fingerprint. Note that to simplify the diagram, only the signals between the anchor nodes 6 and two of the reference points p=1, 2 are shown in FIG. 3, but it will be appreciated that this is just for illustrative purposes and in fact corresponding sets of signal measurements will also be taken for each of the multiple other reference points p=3 . . . P.

The measurements forming the fingerprint may be taken using the same test device moved to different positions, or by different test devices at different positions, or a combination of such approaches. The fingerprint may be compiled during an offline training phase performed before the localization system is put into operation, and/or may be built up or updated dynamically during operation. The test device may be a device other than the mobile device 8 localized, e.g. a dedicated test device used by a commissioning technician. Alternatively (especially in the dynamic case), the test device (or one of the test devices) could be the mobile device 8 to be localized itself.

Once sufficient samples are collected in the fingerprint, it can begin to be used to estimate the position of the mobile device 8 by comparing a set of beacon signal measurements experienced by the mobile device with the sets of beacon signal measurements recorded for each of the reference points (reference positions) in the fingerprint (signal map).

Conventionally the Euclidean distance between fingerprint and measured values is taken as a goodness of fit of a specific reference point p:

$$D_p = \Sigma_b [M(b) - F(p,b)]^2$$

where M(b) is the current measurement of the signal from anchor node b in dB, so on a logarithmic scale; and F(p,b) is the measured value from anchor node b at reference point p (as stored in the fingerprint) also on a logarithmic scale.

The reference point p for which $D_p$ is smallest (or a combination of p's with small $D_p$) is chosen as the estimate of the location of the mobile device 8.

Typically, fingerprinting is done in an offline stage, with a different device type than is used during the active (on-line) stage. In the on-line stage, different mobile devices 8 of several different types and makes will be used. E.g. an RSSI (received signal strength indication) is exactly that: an indication of the strength of the received beacon signal, which is manufacturer dependent. With different mobile devices 8, this will often result in an offset of the reported values. As a result, a reference point with a best match will not necessarily be closest.

As mentioned, the state-of-the-art function for goodness of fit is:

$$D_p = \Sigma_b [M(b) - F(p,b)]^2$$

However, if the mobile device 8 has a different gain in translating signal strength, the formula actually becomes:

$$D_p = \Sigma_b [M(b) - F(p,b) - G]^2$$

where G is the gain difference between the test device that measured the fingerprint and the mobile device 8 that is to be located.

In order to compensate for different manufacturer offsets, according to embodiments of the present disclosure the following metric is used instead:

$$D_p = \Sigma_b [M(b) - F(p,b) - \text{average}(M(b) - F(p,b))]^2$$

So, if the mobile device 8 has a different gain this becomes:

$$D_p = \Sigma_b [M(b) - F(p,b) - G - \text{average}(M(b) - F(p,b) - G)]^2$$

which now is the same as the original:

$$D_p = \Sigma_b [M(b) - F(p,b) - \text{average}(M(b) - F(p,b))]^2$$

i.e. independent of G. In this way, the results will be free of mobile device specific (antenna) gains.

Again, the smallest value of $D_p$ corresponds to the estimated closest reference point p to the mobile device. This may be taken as the estimated location of the mobile device 8, or in embodiments the estimated location may be determined by interpolating between a subset of the N reference points p having the smallest $D_p$ (where N is some predetermined integer). I.e. the improved version of $D_p$ may be used in the same way as the conventional version.

In another embodiment, the method can be used for propagation model based positioning. In that case no fingerprint is measured, but the signal strength at reference points is calculated using some propagation model to describe the attenuation between anchors 6 (b) and reference points (p).

For this case the metric may be expressed as:

$$D_p = \Sigma_b [M(b) - (T_b - A(p,b)) - \text{average}(M(b) - (T_b - A(p,b)))]^2$$

where $T_b$ is the Transmit power of anchor node b, and A(p,b) is the calculated attenuation of the signal between anchor b and reference point p.

In a typical case, where all the beacons have the same transmit power, this reduces to:

$$D_p = \Sigma_b [M(b) + A(p,b) - \text{average}(M(b) + A(p,b))]^2$$

which is independent of the transmit power. So if one knows that the transmit powers are equal, its actual value—in contrast to the state of the art positioning method—does not have to be known for the algorithm to work.

More generally, any other measure of statistical spread in the difference between the signal measurement M and the fingerprint F can be used, as the inventors have identified that the statistical spread can be taken as characteristic of the mobile device's location. Hence this provides an alternative way to estimate the location of a mobile device, instead of the conventional technique of using Euclidian distance. E.g. other measures of statistical spread that can be used include mean absolute difference, mean absolute deviation, or median absolute deviation.

Particularly benficial are measures of deviation of the measured difference from the average difference, e.g. an average deviation from the average difference, such as the variance or the standard deviation, as discussed above. Other suitable measures of the average deviation from the average difference include for example the mean absolute deviation or the median absoute deviation (note also that the term "average" as used herein is not limited to the mean). The reason that such measures are benefical in measuring the location of a mobile device from a network of reference nodes, is that the antenna gain G will always cancel from any such measure. For instance one example that can be used is median absolute deviation.

$$D_p = \sum_b |M(b) - F(p, b) - med(M(b) - F(p, b))|$$

where "med" is the median. In the presence of antenna gain G, this becomes:

$$D_p = \sum_b |M(b) - F(p, b) - G - med(M(b) - F(p, b) - G)|$$

As can be seen, the antenna gain G again appears in both the term expressing the deviation and in the term expressing the average difference. Also, since G is the same or approximately the same over all b (G is a parameter of the mobile device and not a function of b), then this means G can be brought outside the averaging operator (outside the "med" in the above example, or outside "average" in the preceding examples). Hence any measure of deviation from an average will result in G cancelling out.

It will be appreciated the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of estimating a location of a mobile device independent of an antenna gain of the mobile device within an environment based on an arrangement of wireless reference nodes, each of the reference nodes being a device for transmitting or receiving wireless signals; the method comprising:

obtaining a respective measurement of a beacon signal transmitted wirelessly between the mobile device and each of a plurality of said reference nodes, wherein beacon signal is transmitted with the antenna gain of the mobile device;

for each of a plurality of different pre-determined reference locations within the environment, distinct from the reference nodes, obtaining a corresponding measurement of a test signal previously transmitted or modelled to have been transmitted wirelessly between the pre-determined reference location and each of the plurality of reference nodes;

for each of the pre-determined reference locations, determining for each of said plurality of reference nodes a difference between the respective measurement of the beacon signal and the corresponding measurement of the test signal;

for each of the pre-determined reference locations, factoring out the antenna gain of the mobile device and determining a value of a measure of deviation from an average of said differences; and estimating the location of the mobile device based on the factored out antenna gain of the mobile device from a comparison of the values of said measure of deviation determined for the different pre-determined reference locations.

2. The method of claim 1, wherein the measurements of the test signal are empirical measurements taken using a test device placed at each of the pre-determined reference locations.

3. The method of claim 1, wherein the measurements of the test signal are modelled measurements, the test signal being modelled to have been transmitted.

4. The method of claim 1, wherein said obtaining of the measurements of the test signal for each of the pre-determined reference locations is performed by looking up the measurements of the test signals in a pre-stored signal map.

5. The method of claim 1, wherein said comparison comprises selecting the pre-determined reference location having the lowest value of said measure of deviation from amongst said values, and wherein the estimation of the location of the mobile device based on said comparison comprises estimating that location of the mobile device is the pre-determined reference location having said lowest value of the measure of deviation.

6. The method of claim 1, wherein said comparison comprises selecting the N pre-determined reference locations having the lowest values of said measure of deviation from amongst said values, where N is a predetermined integer; and wherein the estimation of the location of the mobile device based on said comparison comprises interpolating between the pre-determined reference locations having said lowest values of the measure of deviation.

7. The method of claim 1, wherein said measure of deviation is variance.

8. The method of claim 1, wherein said measure of deviation is standard deviation, or variance raised to a power other than 1 and other than ½.

9. The method of claim 1, wherein the beacon signals are signals transmitted from the reference nodes to the mobile device, the measurements of the beacon signals being measurements taken at the mobile device; and wherein the test signals are signals transmitted or modelled to have been transmitted from the reference nodes to the pre-determined reference locations, the measurements of the test signal being measurements taken at or modelled to have been taken at the pre-determined reference locations.

10. The method of claim 1, wherein the beacon signals are signals transmitted from the mobile device to the reference nodes, the measurements of the beacon signals being measurements taken at the reference nodes; and wherein the test signals are signals transmitted or modelled to have been transmitted from the pre-determined reference locations to the reference nodes, the measurements of the test signals being measurements taken at or modelled to have been taken at the pre-determined reference locations.

11. An apparatus comprising a localization module configured to perform the method of claim 1.

12. The apparatus of claim 11, wherein the apparatus is said mobile device.

13. The apparatus of claim 11, wherein the apparatus is a location server.

14. A computer program product comprising code embodied on a non-transitory computer-readable storage medium and/or being downloadable therefrom, the code being configured so as when run on a processing apparatus to perform operations in accordance with claim 1.

* * * * *